United States Patent
Dong (10) Patent No.: US 8,750,225 B2
(45) Date of Patent: Jun. 10, 2014

(54) PROCESSING METHOD AND TERMINAL FOR RANDOM ACCESS

(75) Inventor: Ning Dong, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 91 days.

(21) Appl. No.: 13/274,084

(22) Filed: Oct. 14, 2011

(65) Prior Publication Data

US 2012/0093106 A1 Apr. 19, 2012

(30) Foreign Application Priority Data

Oct. 14, 2010 (CN) .......................... 2010 1 0512133

(51) Int. Cl.
*H04W 4/00* (2009.01)
*H04W 48/18* (2009.01)
*H04W 74/08* (2009.01)

(52) U.S. Cl.
CPC .......... *H04W 48/18* (2013.01); *H04W 74/0866* (2013.01)
USPC .......................................... 370/329; 370/341

(58) Field of Classification Search
CPC .......................... H04W 48/18; H04W 74/0866
USPC .......................................................... 370/329
See application file for complete search history.

(56) References Cited

U.S. PATENT DOCUMENTS

| 7,961,680 B2* | 6/2011 | Park et al. ...................... 370/329 |
| 8,457,002 B2* | 6/2013 | Ren et al. ....................... 370/242 |
| 2009/0316637 A1* | 12/2009 | Yi et al. ......................... 370/329 |
| 2010/0040005 A1* | 2/2010 | Kim et al. ...................... 370/329 |
| 2010/0098011 A1 | 4/2010 | Pelletier et al. |
| 2010/0177747 A1* | 7/2010 | Chun et al. ..................... 370/336 |
| 2010/0184445 A1 | 7/2010 | Tseng et al. |
| 2010/0232382 A1* | 9/2010 | Gauvreau et al. ............. 370/329 |
| 2011/0002250 A1* | 1/2011 | Wang et al. .................... 370/311 |
| 2011/0261776 A1* | 10/2011 | Ahn et al. ....................... 370/329 |

FOREIGN PATENT DOCUMENTS

| CN | 101771521 A | 7/2010 |
| CN | 101795497 A | 8/2010 |
| EP | 2129150 A1 | 12/2009 |
| EP | 2170008 A1 | 3/2010 |

OTHER PUBLICATIONS $3^{rd}$ Generation Partnership Project, "Technical Specification Group Radio Access Network; Radio Resource Control (RRC); Protocol Specification" Release 3GPP TS 25.331, V 8.12.0, Sep. 2010.

(Continued)

*Primary Examiner* — Gerald Smarth
(74) *Attorney, Agent, or Firm* — Brinks Gilson & Lione (57) ABSTRACT

A processing method and a terminal for random access are provided in the embodiments of the present invention. The method includes: triggering, by a terminal, first random access through Media Access Control (MAC), and successfully accessing a device at a network side; when a Scheduling Request (SR) of the terminal is triggered, determining whether to trigger next random access, where if the next random access is determined not to be triggered, the terminal does not execute the random access; receiving, by the terminal, a Radio Resource Control (RRC) reconfiguration message that carries an SR related parameter and the RRC reconfiguration message is sent by the device at the network side; and determining, according to the SR related parameter, by the terminal, a Physical Uplink Control Channel (PUCCH) resource for sending the SR, and sending the SR by using the PUCCH resource.

4 Claims, 4 Drawing Sheets

(56) References Cited

OTHER PUBLICATIONS

3rd Generation Partnership Project, "Technical Specification Group Radio Access Network; Evolved Universal Terrestrial Radio Access (E-UTRA; Medium Access Control (MAC) Protocol Specification" Release 8. 3GPP TS 36.321, V8.9.0, Jun. 2010.

3rd Generation Partnership Project, "Technical Specification Group Radio Access Network; Evolved Universal Terrestrial Radio Access (E-UTRA); Radio Resource Control (RRC); Protocol Specification" Release 8. 3GPP TS 36.331, V8.11.0, Sep. 2010.

* cited by examiner

PROCESSING METHOD AND TERMINAL FOR RANDOM ACCESS

CROSS-REFERENCE TO RELATED APPLICATIONS

This application claims priority to Chinese Patent Application No. 201010512133.9, filed on Oct. 14, 2010, which is hereby incorporated by reference in its entirety.

FIELD OF THE INVENTION

The embodiments of the present invention relate to the communications technologies, and in particular, to a processing method and a terminal for random access.

BACKGROUND OF THE INVENTION

Focusing on Orthogonal Frequency Division Multiplexing (hereinafter referred to as OFDM), a Long Term Evolution (hereinafter referred to as LTE) system adopts technologies such as Multiple-Input Multiple-Output (hereinafter referred to as MIMO). Meanwhile, in order to reduce time delay for a user, the LTE system also adopts a flat network architecture policy, so that the network performance is significantly improved.

Random access processes triggered by multiple types of factors exist in the LTE system, including a random access process triggered by Media Access Control (hereinafter referred to as MAC). A scenario corresponding to the random access process triggered by the MAC is that: when a Scheduling Request (hereinafter referred to as SR) is triggered, and a Physical Uplink Control Channel (hereinafter referred to as PUCCH) resource corresponding to the SR is unavailable, or SR triggering reaches maximum retransmission times, the random access process of a User Equipment (hereinafter referred to as UE) is triggered by the MAC. In a currently actual LTE network environment, a time interval (about 100 ms) exists between delivering of a Radio Resource Control (hereinafter referred to as RRC) reconfiguration message of the SR by a base station and first successful random access by the UE. During the time interval, the UE continuously performs the random access process, until the RRC reconfiguration message of the SR delivered by the base station is received and an SR parameter takes effect.

During the implementation of the present invention, the inventor finds that the prior art has at least the following problems.

Because the random access process triggered by the MAC occurs frequently, the access performance and stability of the entire LTE system are greatly influenced. For example, a public Packet Random Access Channel (hereinafter referred to as PRACH) resource is occupied, so that the user access performance of an entire network system is affected, and the stability of data transmission is greatly affected. According to actual network test statistics, when the MAC triggers the random access, 3 times of successful random access processes on average need to be performed to enter a stable status of the system.

SUMMARY OF THE INVENTION

Embodiments of the present invention provide a processing method and a terminal for random access, so as to reduce random access triggering times and improve the access performance of an LTE system.

In an aspect, a processing method for random access provided in an embodiment of the present invention includes:

triggering, by a terminal, first random access through MAC, and successfully accessing a device at a network side;

when an SR of the terminal is triggered, determining whether to trigger next random access, where if the next random access is determined not to be triggered, the terminal does not execute the random access;

receiving, by the terminal, an RRC reconfiguration message that carries an SR related parameter, and the RRC reconfiguration message is sent by the device at the network side; and determining, by the terminal, according to the SR related parameter, a PUCCH resource for sending the SR, and sending the SR by using the PUCCH resource.

In another aspect, a terminal further provided in an embodiment of the present invention includes:

an access module, configured to trigger first random access through MAC, and successfully access a device at a network side;

a determining module, configured to determine whether to trigger next random access when an SR of the terminal is triggered, where if the next random access is determined not to be triggered, the terminal does not execute the random access;

a receiving module, configured to receive an RRC reconfiguration message that carries an SR related parameter and the RRC reconfiguration message is sent by the device at the network side; and a sending module, configured to determine, according to the SR related parameter, a PUCCH resource for sending the SR, and send the SR by using the PUCCH resource.

With the processing method and the terminal for random access provided in the embodiments of the present invention, it is determined whether to trigger the next random access after the first random access succeeds; and if the next random access does not need to be triggered, the SR is sent through a received effective PUCCH, which greatly reduces random access triggering times, so that the access performance of a network system is improved.

BRIEF DESCRIPTION OF THE DRAWINGS

To describe the technical solutions in the embodiments of the present invention or in the prior art more clearly, accompanying drawings required for describing the embodiments or the prior art are introduced briefly in the following. Apparently, the accompanying drawings in the following description are only some embodiments of the present invention, and persons of ordinary skill in the art may also derive other drawings from these accompanying drawings without creative efforts.

DETAILED DESCRIPTION OF THE EMBODIMENTS

To make the objectives, technical solutions, and advantages of the embodiments of the present invention more clearly, the technical solutions in the embodiments of the present invention are described clearly and completely in the following with reference to the accompanying drawings in the embodiments of the present invention. Obviously, the embodiments to be described are only a part rather than all of the embodiments of the present invention. Based on the embodiments of the present invention, other embodiments obtained by persons of ordinary skill in the art without creative efforts shall all fall within the protection scope of the present invention.

Figure 1:
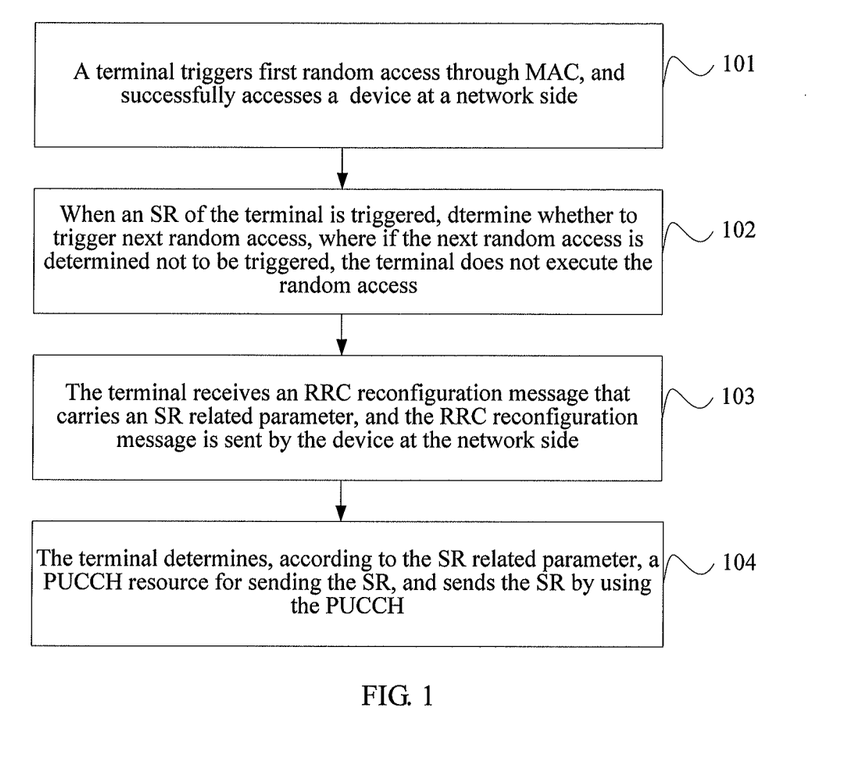
FIG. 1 is a simplified schematic diagram of a processing method for random access according to an embodiment of the present invention.

FIG. 1 is a simplified schematic diagram of a processing method for random access according to an embodiment of the present invention. As shown in FIG. 1, the method includes:

Step 101: A terminal triggers first random access through MAC, and successfully accesses a device at a network side.

Step 102: When an SR of the terminal is triggered, determine whether to trigger next random access.

If the next random access is determined not to be triggered, the terminal does not execute the random access.

Step 102 may include two determining methods, which are respectively described as follows.

In the first determining method, after the terminal successfully accesses the device at the network side, the terminal starts timing, where the timing may be accomplished through hardware devices such as a timer. It is determined whether a time by the timing exceeds a preset time. The preset time may be set by the terminal according to an actual condition of the terminal, or may also be set by the device at the network side such as an evolved Node B (eNB) that is a service node of a UE in an LTE system, through an air interface definition, that is, when the UE accesses the device at the network side, the UE is notified that the preset time is always used in this scenario, and is optimally 100 ms. If the time by the timing does not exceed the preset time, the next random access is not triggered.

In the second determining method, it is determined whether an SR related parameter is effective, where the SR related parameter is an SR parameter configured by the device at the network side, such as the eNB, for the UE to use, and includes a PUCCH resource index (sr-PUCCH-ResourceIndex) corresponding to the SR, an SR configuration index (sr-ConfigIndex), and maximum times of SR transmission (dsr-TransMax). If the SR related parameter of the terminal is ineffective, the next random access is not triggered.

Step 103: The terminal receives an RRC reconfiguration message that carries the SR related parameter, and the RRC reconfiguration message is sent by the device at the network side.

Step 104: The terminal determines, according to the SR related parameter, a PUCCH resource for sending the SR, and sends the SR by using the PUCCH resource.

In the following, the first method and the second method for determining whether to trigger the next random access are taken as examples to describe the processing method for random access provided in the embodiment of the present invention in detail.

Figure 2:
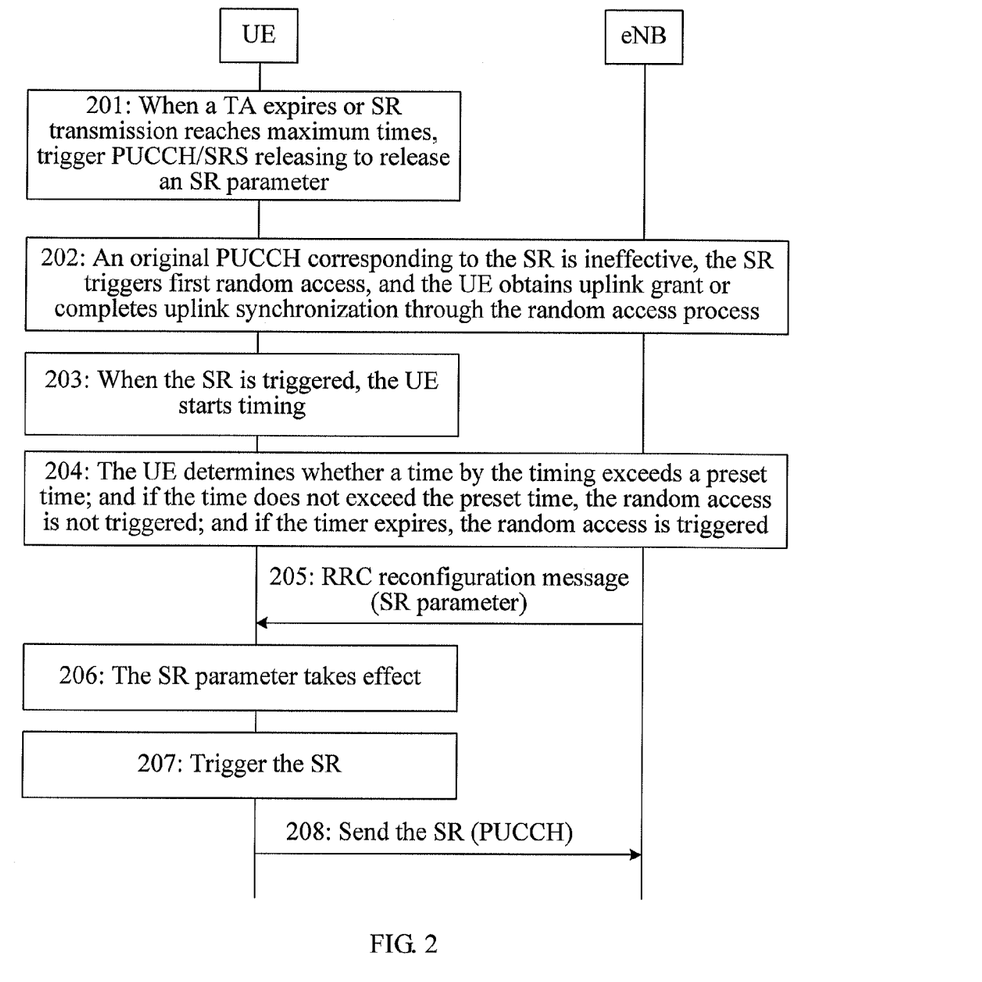
FIG. 2 is a process interaction diagram of a processing method for random access according to an embodiment of the present invention.

FIG. 2 is a process interaction diagram of a processing method for random access according to an embodiment of the present invention. As shown in FIG. 2, the method includes:

Step 201: When a Time Alignment (hereinafter referred to as TA) of a UE expires or SR transmission reaches maximum times, MAC triggers an RRC to perform a PUCCH/Sounding Reference Signal (hereinafter referred to as SRS) releasing process, where the releasing process also releases a PUCCH resource corresponding to an SR.

Step 202: Because an original PUCCH resource corresponding to the SR is released, that is, the original PUCCH resource is ineffective, once the SR needs to be reported, a random access process is triggered. The UE obtains uplink grant or completes uplink synchronization through the random access process, and the access process may be completed successfully.

When new data arrives at the UE, a Buffer Status Report (hereinafter referred to as BSR) is triggered, and SR reporting is further triggered.

Step 203: After the random access of the UE succeeds, when the SR is triggered, the UE starts timing, which may be to start an SR related timer.

After the random access succeeds, the UE triggers the BSR due to the arrival of the new data, and further triggers the SR reporting. However, the PUCCH resource corresponding to the SR is ineffective at this time, and a new SR related parameter used for indicating that the PUCCH resource is ineffective does not arrive at the UE after the access succeeds; at this time, if the UE needs to send the SR, the random access is re-triggered to obtain the PUCCH resource according to a solution in the prior art. Step 203 of this embodiment is set in order to reduce such unnecessary random access triggering.

Step 204: The UE determines whether a time by the timing of the timer exceeds a preset time.

If the time by the timing does not exceed the preset time, the random access is not triggered.

If the time by the timing exceeds the preset time, the random access is triggered.

The preset time of the SR related timer may be set by the UE according to an actual condition of the UE, and may also be set by the device at the network side such as an eNB through a UU (an air interface between the eNB and the terminal) air interface definition. For example, when the UE accesses the device at the network side, the UE is notified that the preset time may be used in this scenario, and optimally, the preset time is 100 ms.

Step 205: The eNB sends an RRC reconfiguration message carrying the SR related parameter to the UE.

It should be noted that, after first random access of the UE succeeds, the eNB does not send the RRC reconfiguration message about the SR related parameter to the UE until after a time interval; therefore, step 205 may occur during an execution process of step 203 and step 204. If the UE receives the RRC reconfiguration message about the SR related parameter sent by the eNB, the timer stops running and subsequent steps are executed. The SR related parameter is an SR parameter configured by the eNB for the UE to use, and includes a PUCCH resource index (sr-PUCCH-ResourceIndex) corresponding to the SR, an SR configuration index (sr-ConfigIndex), and maximum times of the SR transmission (dsr-TransMax).

It should be noted that in step 201, the UE also releases the PUCCH resource corresponding to the SR, that is, the original PUCCH resource is ineffective. The SR related parameter received in step 205 may be used to indicate a new PUCCH resource for the UE, so that the UE uses the new PUCCH resource to send the SR.

Step 206: After receiving the RRC reconfiguration message that carries the SR related parameter, where the RRC reconfiguration message is sent by the eNB, the UE performs configuration for the SR related parameter.

The configuration may include: configuring the received PUCCH resource corresponding to the SR related parameter to serve as the PUCCH resource for sending the SR.

Step 207: After the configuration of the SR related parameter takes effect, the UE re-triggers the SR through the BSR.

Step 208: The UE directly sends the SR by using the newly configured PUCCH.

Figure 3:
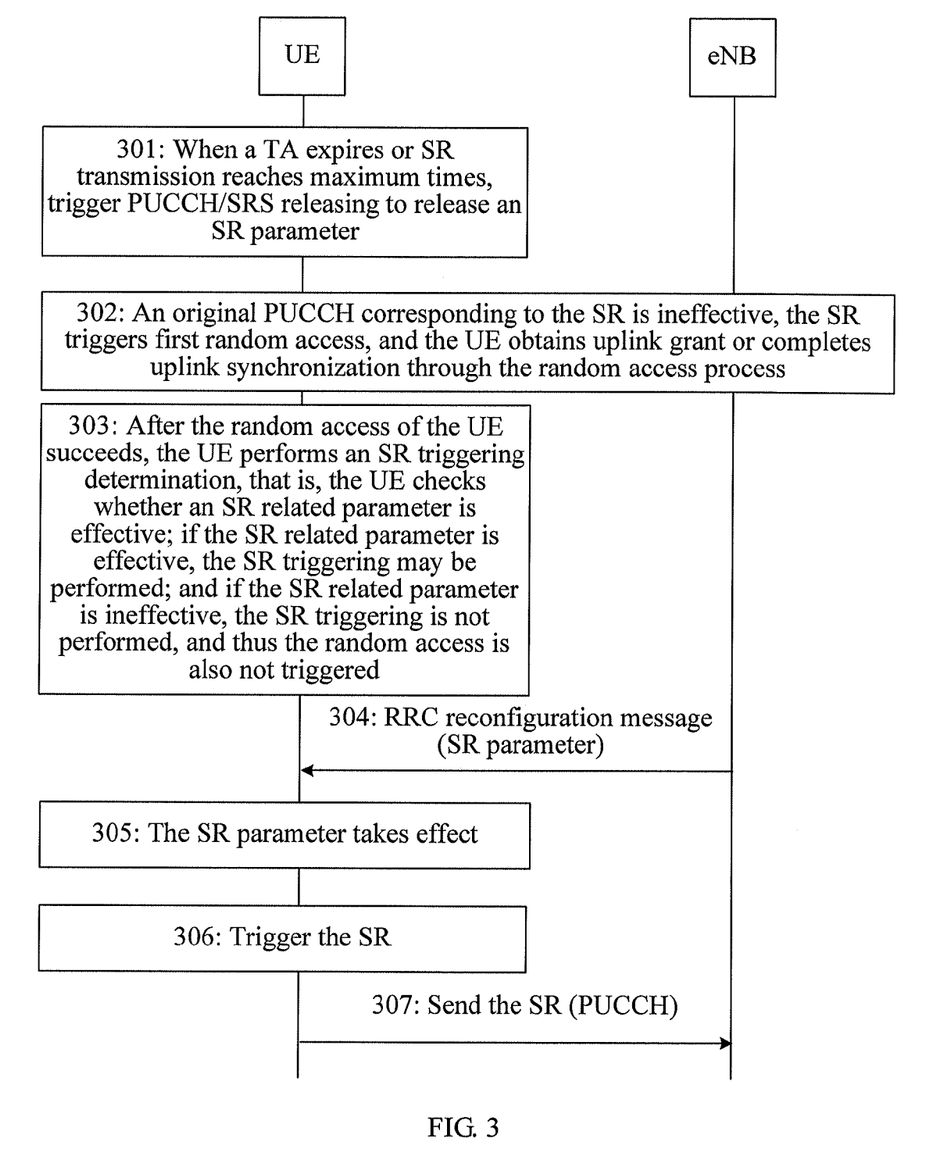
FIG. 3 is a process interaction diagram of a processing method for random access according to an embodiment of the present invention.

FIG. 3 is a process interaction diagram of a processing method for random access according to an embodiment of the present invention. As shown in FIG. 3, the method includes:

Step 301: When a TA of a UE expires or SR transmission reaches maximum times, MAC triggers an RRC to perform a PUCCH/SRS releasing process, where the releasing process also releases a PUCCH resource corresponding to an SR.

Step 302: Because an original PUCCH resource corresponding to the SR is released, that is, the original PUCCH resource is ineffective, once the SR needs to be reported, a random access process is triggered. The UE obtains uplink grant or completes uplink synchronization through the random access process, and the access process may be completed successfully.

When new data arrives at the UE, a BSR is triggered, and SR reporting is further triggered.

Step 303: After the random access of the UE succeeds, an SR triggering determination is performed.

Specifically, a process of performing the SR triggering determination may be: the UE periodically checks whether an SR related parameter is effective.

If the SR related parameter is effective, the SR triggering may be performed.

If the SR related parameter is ineffective, the SR triggering is not performed, and thus the random access is also not triggered.

A specific checking method may be as follows: checking whether an RRC reconfiguration message that carries the SR related parameter is received, where the RRC reconfiguration message is sent by a device at a network side; and if a new available SR related parameter carried in the RRC reconfiguration message is not received, determining that the SR related parameter of the terminal is ineffective.

The SR related parameter is an SR parameter configured by an eNB for the UE to use, and includes a PUCCH resource index (sr-PUCCH-ResourceIndex) corresponding to the SR, an SR configuration index (sr-ConfigIndex), and maximum times of the SR transmission (dsr-TransMax). Checking whether the SR related parameter is effective by the UE specifically may be checking whether the PUCCH resource in the SR related parameter is effective. If the PUCCH resource in the SR related parameter is effective, the effective PUCCH may be used for sending the SR, and therefore, the random access does not need to be triggered. In step 301, the UE also releases the PUCCH resource corresponding to the SR, that is, the original PUCCH resource is ineffective. Therefore, the effective SR related parameter may be used to indicate a new PUCCH resource for the UE, so that the UE uses the new PUCCH resource to send the SR. A checking period may be once every millisecond, or may be adjusted according to different hardware conditions.

After the random access succeeds, the PUCCH resource corresponding to the SR is ineffective, and the configuration of a new SR parameter does not take effect, that is, the new PUCCH resource does not take effect. According to the prior art, if the SR needs to be sent at this time, the random access is re-triggered. In order to reduce such unnecessary random access triggering in the prior art, before the new SR parameter is received, that is, before the PUCCH resource takes effect, the random access is not executed even if the SR triggering is received.

Step 304: The eNB sends the RRC reconfiguration message carrying the SR related parameter to the UE.

Step 305: After receiving the RRC reconfiguration message that carries the SR related parameter, where the RRC reconfiguration message is sent by the eNB, the UE performs configuration for the SR related parameter.

The configuration may include: configuring the effective PUCCH resource corresponding to the SR related parameter to serve as the PUCCH resource for sending the SR.

Step 306: After the configuration of the SR related parameter takes effect, the UE re-triggers the SR through the BSR.

Step 307: The UE directly sends the SR by using the newly configured PUCCH.

With the processing method for random access provided in this embodiment of the present invention, it is determined whether to trigger next random access after first random access succeeds; and if the next random access does not need to be triggered, the terminal sends the SR according to the PUCCH resource in the SR related parameter sent by the device at the network side, which greatly reduces random access triggering times, so that the access performance of a network system and the stability of data transmission of the UE are improved.

Figure 4:
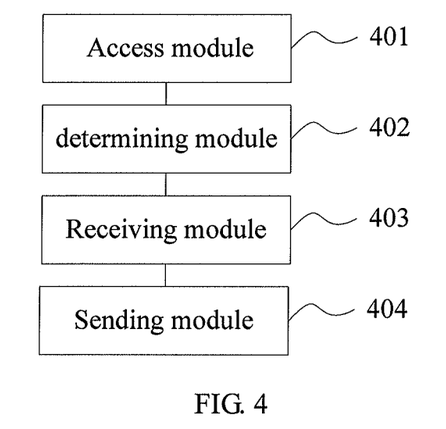
FIG. 4 is a schematic structural diagram of a terminal according to an embodiment of the present invention.

FIG. 4 is a schematic structural diagram of a terminal according to an embodiment of the present invention. As shown in FIG. 4, the terminal is a specific subject for executing the preceding processing method for random access, and specifically may be a mobile terminal, which specifically includes an access module 401, a determining module 402, a receiving module 403, and a sending module 404. The access module 401 is configured to trigger first random access through MAC and enable the terminal to access a device at a network side successfully. The determining module 402 is configured to determine whether to trigger next random access when an SR of the terminal is triggered, where if the next random access is determined not to be triggered, the terminal does not execute the random access. The receiving module 403 is configured to receive an RRC reconfiguration message that carries an SR related parameter and the RRC reconfiguration message is sent by the device at the network side. The sending module 404 is configured to, determine according to the SR related parameter, a PUCCH resource for sending the SR, and send the SR by using the PUCCH resource.

Figure 5:
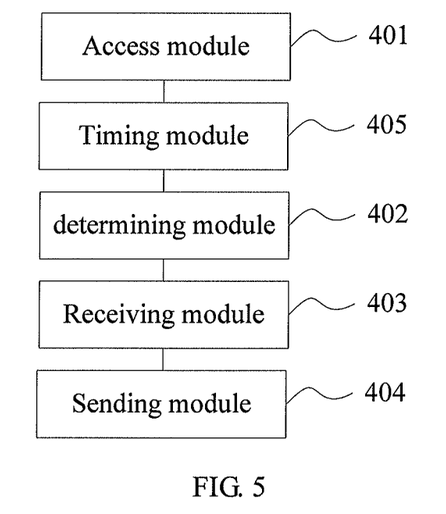
FIG. 5 is a second schematic structural diagram of a terminal according to an embodiment of the present invention.

In an implementation manner, as shown in FIG. 5, the terminal may further include a timing module 405, where the timing module 405 is configured to start timing when the access module 401 enables the terminal to access the device at the network side successfully. Correspondingly, the determining module 402 may include a determining unit. The determining unit may be configured to determine whether the time of the timing module 405 exceeds a preset time. If a determining result of the determining unit is that the time does not exceed the preset time, a determining result of the determining module 402 is that the next random access is not triggered.

In another implementation manner, the determining module 402 may include a checking unit, where the checking unit is configured to check whether the SR related parameter of the terminal is effective. If a checking result of the checking unit is that the SR related parameter of the terminal is ineffective, a determining result of the determining module 402 is that the next random access is not triggered. The SR related parameter includes a PUCCH resource index (sr-PUCCH-ResourceIndex) corresponding to the SR, an SR configuration index (sr-ConfigIndex), and maximum times of SR transmission (dsr-TransMax). The checking unit may include a checking subunit, configured to check whether the RRC reconfiguration message that carries the SR related parameter is received, where the RRC reconfiguration message is sent by the device at the network side; and if the RRC reconfiguration message that carries the SR related parameter is not received, it is determined that the SR related parameter of the terminal is ineffective.

With the terminal provided in this embodiment of the present invention, it is determined whether to trigger the next random access after the first random access succeeds; and if the next random access does not need to be triggered, the SR is sent by using an effective PUCCH, which greatly reduces random access triggering times, so that the access performance of a network system and the stability of data transmission of a UE are improved.

Figure 6:
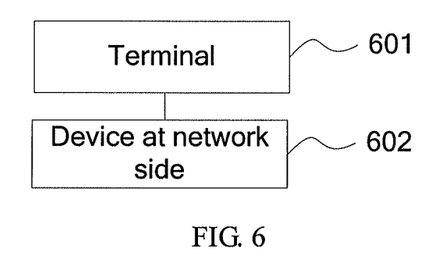
FIG. 6 is a schematic structural diagram of a processing system for random access according to an embodiment of the present invention.

FIG. 6 is a schematic structural diagram of a processing system for random access according to an embodiment of the present invention. The system includes a terminal 601 and a device at a network side 602, where the terminal 601 may be the terminal provided in the preceding embodiment. For a corresponding method and structure, references may be made to the content disclosed in the preceding embodiments, and the details are not described here again.

Persons of ordinary skill in the art may understand that all or a part of the steps of the method according to the embodiments may be implemented by a program instructing relevant hardware. The program may be stored in a computer readable storage medium. When the program runs, the steps of the method according to the embodiments are executed. The storage medium may include any medium that is capable of storing program codes, such as a Read-Only Memory (ROM), a Random Access Memory (RAM), a magnetic disk, or a compact disk.

The described device embodiments are merely exemplary. Units described as separate components may be or may not be physically separated. Components shown as units may be or may not be physical units, that is, may be located in one place or may be distributed to at least two network units. Some or all of the modules may be selected to achieve the objective of the solutions of the embodiments according to actual demands. Persons of ordinary skill in the art may understand and implement the present invention without making creative efforts.

Finally, it should be noted that the preceding embodiments are merely used for describing the technical solutions of the present invention, but not intended to limit the present invention. It should be understood by persons of ordinary skill in the art that although the present invention is described in detail with reference to the embodiments, modifications may be made to the technical solutions described in the embodiments, or equivalent replacements may be made to some technical features in the technical solutions; and these modifications or replacements do not make the essence of the corresponding technical solutions depart from the spirit and scope of the technical solutions in the embodiments of the present invention.

What is claimed is:

1. A processing method for random access, comprising:
triggering, by a terminal, first random access through Media Access Control (MAC), and determining successfully accessing a device at a network side after completing uplink synchronization to the device at the network side through the first random access;
after the terminal successfully accesses the device at the network side, starting timing by the terminal;
when a Scheduling Request (SR) of the terminal is triggered, determining whether to trigger next random access, comprising: determining whether a time by the timing exceeds a preset time, if the time by the timing does not exceed the preset time, determining not to trigger the next random access;
receiving, by the terminal, a Radio Resource Control (RRC) reconfiguration message that carries an SR related parameter, wherein the RRC reconfiguration message is sent by the device at the network side and wherein the SR related parameter carried in the RRC reconfiguration message is: a Physical Uplink Control Channel (PUCCH) resource index corresponding to the SR, an SR configuration index, and maximum times of SR transmission; and
determining, by the terminal, a PUCCH resource for sending the SR according to the SR related parameter carried in the RRC reconfiguration message, and sending the SR by using the PUCCH resource.

2. The processing method for random access according to claim 1, wherein before the triggering, by the terminal, the first random access through the MAC and successfully accessing the device at the network side, the method further comprises:
when a Time Alignment (TA) of the terminal expires or SR transmission reaches maximum times, releasing a current PUCCH resource of the terminal for sending the SR.

3. A terminal, comprising:
a processor and a memory coupled to the processor, configured to:
trigger first random access through Media Access Control (MAC), and determine successfully accessing a device at a network side after completing uplink synchronization to the device at the network side through the first random access;
after the terminal successfully accesses the device at the network side, start timing by the terminal;
determine whether to trigger next random access when a Scheduling Request (SR) of the terminal is triggered, comprising: determining whether a time by the timing exceeds a preset time, if the time by the timing does not exceed the preset time, determining not to trigger the next random access;
receive a Radio Resource Control (RRC) reconfiguration message that carries an SR related parameter, wherein the RRC reconfiguration message is sent by the device at the network side and wherein the SR related parameter carried in the RRC reconfiguration message is: a Physical Uplink Control Channel (PUCCH) resource index corresponding to the SR, an SR configuration index, and maximum times of SR transmission; and
determine, a PUCCH resource for sending the SR according to the SR related parameter carried in the RRC reconfiguration message, and send the SR by using the PUCCH resource.

4. A non-transitory computer-readable storage medium, comprising computer program codes which when executed by a computer processor cause the compute processor to execute process of:
triggering, by a terminal, first random access through Media Access Control (MAC), and determining successfully accessing a device at a network side after completing uplink synchronization to the device at the network side through the first random access;

after the terminal successfully accesses the device at the network side, starting timing by the terminal;

when a Scheduling Request (SR) of the terminal is triggered, determining whether to trigger next random access, comprising: determining whether a time by the timing exceeds a preset time, if the time by the timing does not exceed the preset time, determining not to trigger the next random access;

receiving, by the terminal, a Radio Resource Control (RRC) reconfiguration message that carries an SR related parameter, wherein the RRC reconfiguration message is sent by the device at the network side and wherein the SR related parameter carried in the RRC reconfiguration message is: a Physical Uplink Control Channel (PUCCH) resource index corresponding to the SR, an SR configuration index, and maximum times of SR transmission; and determining, by the terminal, a PUCCH resource for sending the SR according to the SR related parameter carried in the RRC reconfiguration message, and sending the SR by using the PUCCH resource.

* * * * *